US011996716B1

(12) United States Patent
Shum et al.

(10) Patent No.: US 11,996,716 B1
(45) Date of Patent: May 28, 2024

(54) JUMPER CABLES WITH A GROUNDING MAGNET ASSEMBLY

(71) Applicant: VECTOR PRODUCTS, INC., Boca Raton, FL (US)

(72) Inventors: Ling To Shum, Boca Raton, FL (US); Salvador Herrera, Tamarac, FL (US)

(73) Assignee: VECTOR PRODUCTS, INC., Boca Raton, FL (US)

( * ) Notice: Subject to any disclaimer, the term of this patent is extended or adjusted under 35 U.S.C. 154(b) by 437 days.

(21) Appl. No.: 17/217,801

(22) Filed: Mar. 30, 2021

Related U.S. Application Data

(60) Provisional application No. 63/002,442, filed on Mar. 31, 2020.

(51) Int. Cl.
*H02J 7/00* (2006.01)
*H01B 7/02* (2006.01)
*H01F 7/02* (2006.01)
*H01R 11/12* (2006.01)
*H01R 11/24* (2006.01)
*H01R 13/62* (2006.01)

(52) U.S. Cl.
CPC .............. *H02J 7/0042* (2013.01); *H01B 7/02* (2013.01); *H01F 7/02* (2013.01); *H01R 11/12* (2013.01); *H01R 11/24* (2013.01); *H01R 13/6205* (2013.01)

(58) Field of Classification Search
CPC ......... H02J 7/0042; H01B 7/02; H01R 11/12; H01R 11/24; H01F 7/02

USPC .......................................................... 320/105
See application file for complete search history.

(56) References Cited

U.S. PATENT DOCUMENTS

| | | | | |
|---|---|---|---|---|
| 4,488,147 A * | 12/1984 | Signorile | ............... | G01R 31/67 320/105 |
| 9,083,099 B2 * | 7/2015 | Yi | .......................... | H01R 11/30 |
| 9,142,912 B1 * | 9/2015 | Allen | .................... | H01R 11/30 |
| 9,647,351 B2 * | 5/2017 | Shelton | .................. | H01R 11/24 |
| 9,728,867 B2 * | 8/2017 | Allen | .................. | H01R 11/281 |
| 10,439,411 B2 * | 10/2019 | Narayanasamy | ..... | H02J 7/0045 |

* cited by examiner

*Primary Examiner* — Richard V Muralidar
(74) *Attorney, Agent, or Firm* — DANIEL S. POLLEY, P.A.

(57) ABSTRACT

An improved jump starter system where at least one negative clamp/clip for the system is replaced with a magnet to allow a user to easily place the magnet on a dead metal area of the vehicle for an improved electrical connection. The improved jump starter preferably incorporates at least one grounding magnet to replace the conventional negative clamp. The grounding magnet provides for an alternative and improved way for making electrical connection by the negative/neutral cable. The improved jumper system is particularly idea for use in the automotive industry where a jump start system is used where the vehicle battery is depleted, as the improved jump starter system uses a magnet connection which improves the success for an engine start by providing a solid connection and closing the circuit between the jump starter and the vehicle battery.

10 Claims, 2 Drawing Sheets

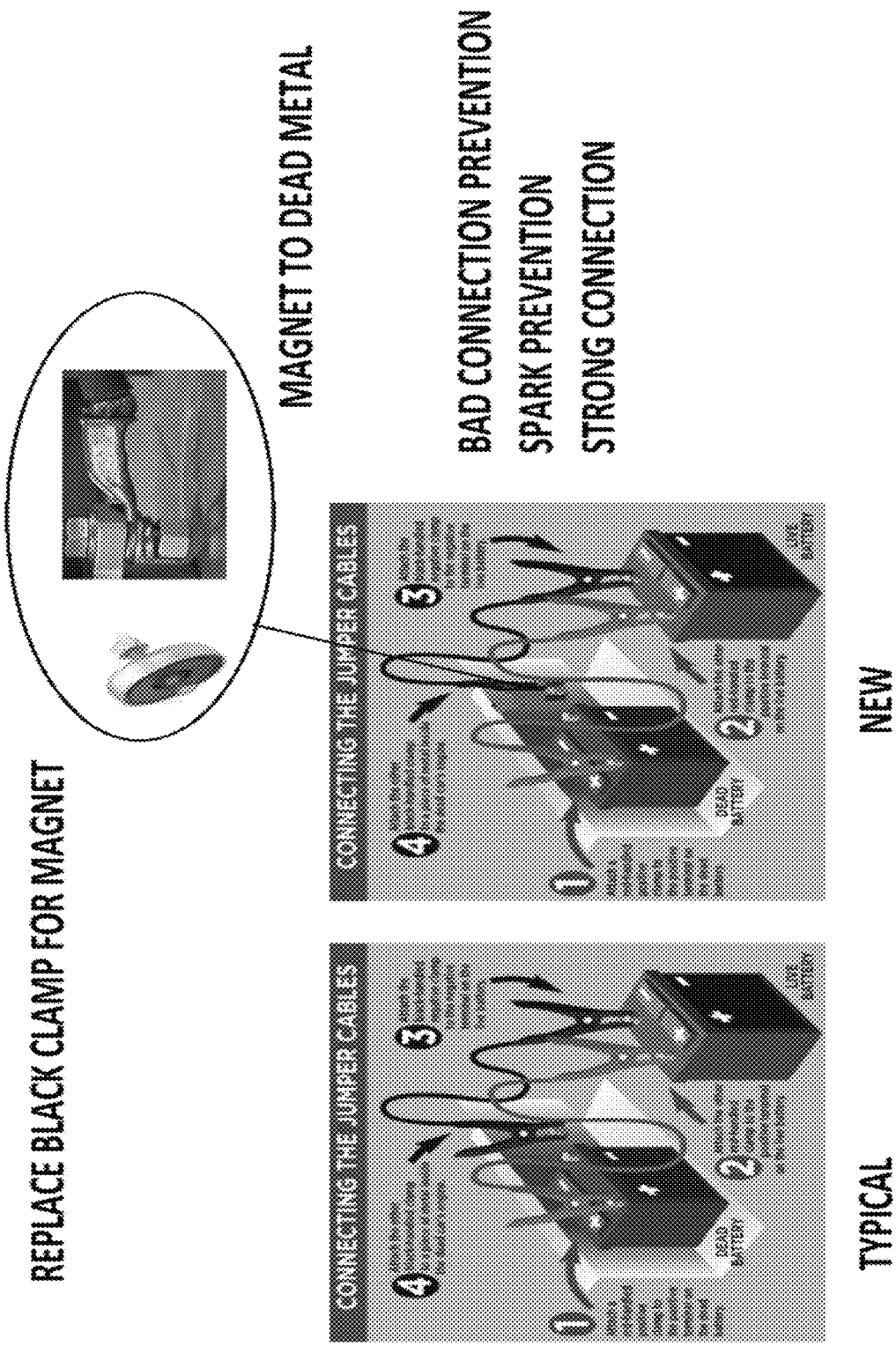

JUMPER CABLES WITH A GROUNDING MAGNET ASSEMBLY

This application claims the benefit of and priority to U.S. Provisional Patent Application Ser. No. 63/002,442, filed Mar. 31, 2020, which is incorporated by reference in its entirety, as if set forth herein, for all purposes.

1. FIELD OF THE DISCLOSURE

The disclosure relates generally to automotive products and more particularly to jumper cable products.

2. BACKGROUND

Traditional jumper/jump starter cables employ clamp connections in order to connect the traditionally red (+) and black (−) cables directly to the terminals of the depleted vehicle battery. For one or more reasons it is common for the black clamp connection to the vehicle battery terminal to be bad or not strong, and also sometimes creating sparks from the connection. At times with conventional jumper cables, users experience failed engine start attempts due to a loose and/or improper connection. Additionally, car manufacturers have been more frequently installing the vehicle battery in remote locations, such as, without limitation, the vehicle trunk area, under a car seat and/or other locations in the vehicle which are not fully or easily accessible to the consumer for accessing the battery poles of the vehicle battery. The disclosed improved jumper cables are directed to reducing, if not eliminating, the above-referenced problems often experienced when connecting the black jump clamp of the jumper/jump starter cables directly to the negative/black terminal of the vehicle battery.

SUMMARY OF THE DISCLOSURE

Generally disclosed are jump starter cables using a grounding magnet in place of the black clamp to increase connection options for the jump starter cables, as well as, reducing, if not eliminating, bad and/or weak connections and sparks commonly experienced with traditional jump starter cables.

BRIEF DESCRIPTION OF THE DRAWINGS

FIG. 1 is a perspective view of a non-limiting embodiment for a jumper cable grounding magnet in accordance with the present disclosure;

FIG. 2 is a comparison illustration showing use of a conventional jumper cables as compared to use of the improved jumper cables in accordance with the present disclosure;

DETAILED DESCRIPTION

Figure 3:
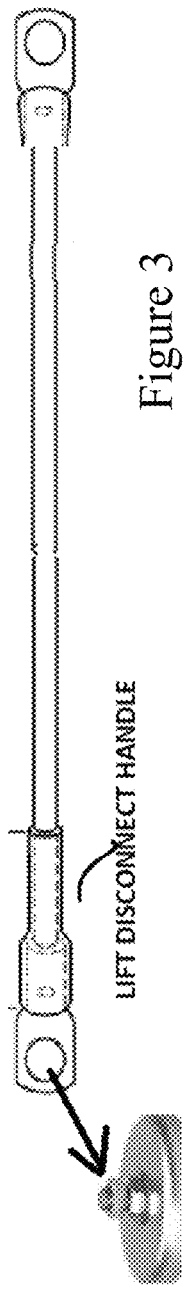
FIG. 3 is a non-limiting example showing a connection of the grounding cable to a good ("charged") battery and to the grounding magnet in accordance with the present disclosure.

As seen in the drawings, novel improved jumper cables are provided by incorporating/using a grounding magnet in place of the negative clamp on the end of the black/negative cable end that is normally secured to the negative terminal of the depleted vehicle battery during a jump or charging action. Thus, at least one of the negative clamps/clips/alligator clips of a jump starter system can be replaced with a grounding magnet to provide for at least one magnetic clamp/magnetic attachment grounding magnet for the jump start system.

The magnet/magnetic assembly (for magnetically clamping or magnetically attaching) can be electrically connected/secured to the associated cable/wire/conductor (preferably insulated) of the jumper system (i.e. one end of the black cable) by any conventional connection. A non-limiting embodiment for the magnet connector that can be used to replace the conventional clamp is shown in FIG. 1.

With use of the disclosed novel jumper system, the possibilities of a bad connection, loose connection, spark prevention, etc., as well as possible fire (i.e. where conventional clamp is accidentally connected to a fuel line during an engine start) can be significantly reduced, if not eliminated.

By replacing the negative clamp with a grounding magnet, the consumer/user can secure the magnet end of the cable directly to dead metal as intended and recommended, which should also help to increase connectivity and energy transfer.

Accordingly, the improved jump starter preferably incorporates at least one grounding magnet to replace the conventional negative clamp. The grounding magnet provides for an alternative and improved way for making electrical connection by the negative/neutral cable. The disclosed improved jumper system is particularly idea for use in the automotive industry where a jump start system is used where the vehicle battery is depleted, as the disclosed improved jump starter system using a magnet connection improves the success for an engine start by providing a solid connection and closing the circuit between the jump starter and the vehicle battery.

Accordingly, some non-limiting benefits and advantages of the disclosed novel jump start system, include: (1) increase success during an engine start; (2) prevent, or at least reduce, loose and/or improper connections; (3) prevent, or at least reduce reverse connections by placing the magnet in the negative side of the jump starter; and (4) maximize, at least increase, energy transfer.

In use, where the user's vehicle has a dead vehicle battery, the disclosed novel jump start system can be installed to the vehicle by the user in the following non-limiting manner:
1. Locate vehicle battery.
2. Locate positive pole on the battery and connect jump start positive clamp to battery pole.
3. Locate grounding magnet on jump start system and attached to dead metal in the vehicle, and preferably to dead metal of the engine block inside the engine compartment.

By being able to preferably use the easily accessible dead metal area of the engine block for the negative cable, as opposed to the negative post/terminal of the vehicle battery, the disclosed novel system also address the above mentioned "battery access" problems, when the vehicle battery is located under the vehicle seat, within the trunk of the vehicle, etc.

FIG. 2 shows a comparison of the non-limiting steps involved with attaching conventional jumper cables and attaching the disclosed novel jump start system incorporating at least one magnet electrical connection.

FIG. 3 illustrates a non-limiting example of how the grounding/negative cable can be secured to the grounding magnet. In this non-limiting example, the negative conductor of the jumper cable can be provided with an eyelet terminal connector, at least at one end, and preferably at opposite ends of the negative conductor. One end of the negative conductor can be connected to the negative pole/terminal of the good ("charged") battery, while the opposite end can get screwed on or otherwise secured to a terminal post of the grounding magnet. In one non-limiting embodiment, the negative conductor can be provided with a crimped eye terminal at each end.

Figure 4:
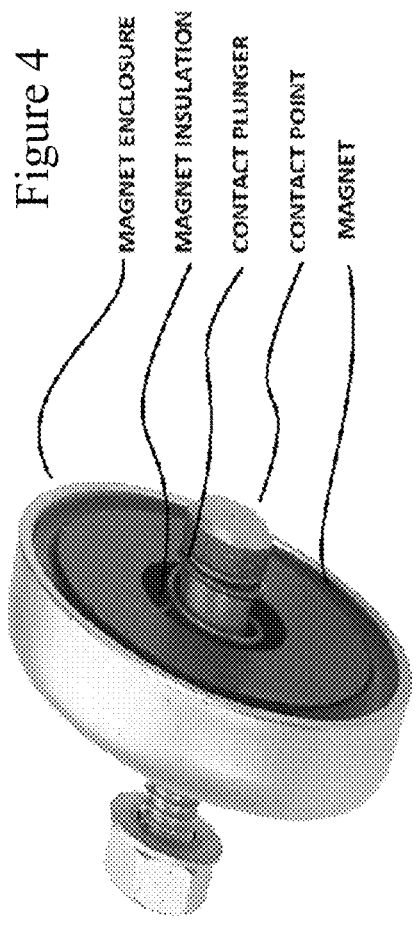
FIG. 4 is a non-limiting example of a grounding example of a grounding magnet that can be used with the disclosed novel jumper cable system.

As best seen in FIG. 4, in one non-limiting embodiment, the eyelet terminal can be screwed on the contact terminal preferably at a top side of the magnet. A contact plunger can be recessed inside or within the magnet center cavity and preferably does not make contact with a dead metal area of the vehicle (i.e. engine block) until the force of the magnet pushes down the magnet assembly against the dead metal. An insulating ring can be provided in the center of the magnet cavity to prevent contact and electricity from traveling to the magnet enclosure.

Other connection methods for securing the magnet/magnet assembly at one end of the negative wire/conductor that permits for the electrical connection of the magnet/magnet assembly to the wire/conductor can also be used and are considered within the scope of the disclosure.

Preferably, the positive and negative wires/conductors of the jump starter cables/jumper cables can be insulated. Also, a portion of the insulated positive wire/conductor can be secured to a portion of the insulated negative wire/conductor.

Various types of magnets can be used as the grounding magnet and all are considered within the scope of the disclosure. In a preferred, though non-limiting, embodiment, the magnet can be a 500 Amp grounding magnet, having high strength, and preferably provided with a lift disconnect handle.

When not in use, the magnet assembly can be stowed or housed within the jump start system housing, though such is not considered limiting.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the device and their locations, electronic communication methods between the system components, magnet types, cables, wiring, attachment or securement mechanisms, mechanical connections, electrical connections, dimensions, values, materials, charging methods, battery types, applications/uses, tools and devices that can be used therewith, etc. discussed above or shown in the drawing, if any, are merely by way of example and are not considered limiting and other component(s) and their locations, electronic communication methods, magnet types, cables, wiring, attachment or securement mechanisms, mechanical connections, electrical connections, dimensions, values, materials, charging methods, battery types, applications/uses, tools and devices that can be used therewith, etc. can be chosen and used and all are considered within the scope of the disclosure.

The benefits, advantages, solutions to problems, and any element(s) that may cause any benefit, advantage, or solution to occur or become more pronounced are not to be construed as a critical, required, or essential features or elements of any or all the claims.

While the novel device has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. An improved jumper cables comprising:
   a first wire or conductor having a first end and a second end and a first length extending from the first end to the second end, the first wire or conductor associated with a positive polarity;
   a second wire or conductor having a first end and a second end a second length extending from the first end of the second cable to the second end of the second cable, the second wire or conductor associated with a negative or ground polarity;
   a first electrical connector secured at the first end of the first wire or conductor and in electrical communication with the first wire or conductor and a second electrical connector secured at the second end of the first wire or conductor and in electrical communication with the first wire or conductor;
   a third electrical connector secured at the first end of the second wire or conductor and in electrical communication with the second wire or conductor and a fourth electrical connector secured at the second end of the second wire or conductor and in electrical communication with the second wire or conductor;
   wherein the fourth electrical connector is a different type of connector than a type of connector for the first electrical connector, the second electrical connector and the third electrical connector;
   wherein the fourth electrical connector is a grounding magnet assembly comprising:
   a magnet enclosure having a top side and an open bottom and defining a receiving area;
   a magnet disposed within the receiving area and having a center cavity;
   a contact terminal post extending upward from the top side of the magnet enclosure;
   a contact plunger initially recessed within the magnet enclosure or within the magnet center cavity; and
   an insulating ring at least partially disposed within the magnet center cavity to prevent electricity from traveling to the magnet enclosure.

2. The improved jumper cables of claim 1 wherein the first electrical connector is a first clamp or clip, the second electrical connector is a second clamp or clip and the third electrical connector is a third clamp or clip.

3. The improved jumper cables of claim 1 wherein the second end of the second wire or conductor having an eyelet for receipt of the contact terminal post when securing the grounding magnet assembly at the second end of the second wire or conductor.

4. The improved jumper cables of claim 3 wherein the grounding magnet assembly further comprising a fastener secured to the contact terminal post for maintaining the securement of the grounding magnet assembly at the second end of the second wire or conductor.

5. The improved jumper cables of claim 4 wherein at least a portion of the contact terminal post is threaded and the fastener is a nut threadedly secured to the contact terminal post.

6. An improved jumper cables comprising:
a first insulated wire or conductor having a first end and a second end and a first length extending from the first end to the second end, the first insulated wire or conductor associated with a positive polarity;
a second insulated wire or conductor having a first end and a second end a second length extending from the first end of the second cable to the second end of the second cable, the second insulated wire or conductor associated with a negative or ground polarity;
a first electrical connector secured at the first end of the first insulated wire or conductor and in electrical communication with the first insulated wire or conductor and a second electrical connector secured at the second end of the first insulated wire or conductor and in electrical communication with the first insulated wire or conductor;
a third electrical connector secured at the first end of the second insulated wire or conductor and in electrical communication with the second insulated wire or conductor and a fourth electrical connector secured at the second end of the second insulated wire or conductor and in electrical communication with the second insulated wire or conductor;
wherein the fourth electrical connector is a different type of connector than a type of connector for the first electrical connector, the second electrical connector and the third electrical connector;
wherein a portion of the first insulated wire or conductor is attached to a portion of the second insulated wire;
wherein the fourth electrical connector is a grounding magnet assembly comprising:
a magnet enclosure having a top side and an open bottom and defining a receiving area;
a magnet disposed within the receiving area and having a center cavity;
a contact terminal post extending upward from the top side of the magnet enclosure;
a contact plunger initially recessed within the magnet enclosure or within the magnet center cavity; and
an insulating ring at least partially disposed within the magnet center cavity to prevent electricity from traveling to the magnet enclosure.

7. The improved jumper cables of claim 6 wherein the first electrical connector is a first clamp or clip, the second electrical connector is a second clamp or clip and the third electrical connector is a third clamp or clip.

8. The improved jumper cables of claim 6 wherein the second end of the second wire or conductor having an eyelet for receipt of the contact terminal post when securing the grounding magnet assembly at the second end of the second wire or conductor.

9. The improved jumper cables of claim 8 wherein the grounding magnet assembly further comprising a fastener secured to the contact terminal post for maintaining the securement of the grounding magnet assembly at the second end of the second wire or conductor.

10. The improved jumper cables of claim 9 wherein at least a portion of the contact terminal post is threaded and the fastener is a nut threadedly secured to the contact terminal post.

* * * * *